United States Patent

[11] 3,631,954

| [72] | Inventor | Albert E. Coaley<br>Maulden, England |
|---|---|---|
| [21] | Appl. No. | 872,811 |
| [22] | Filed | Oct. 31, 1969 |
| [45] | Patented | Jan. 4, 1972 |
| [73] | Assignee | SKF Industries, Inc.<br>King of Prussia, Pa. |

[54] SELF-ALIGNING CLUTCH RELEASE BEARING
5 Claims, 3 Drawing Figs.

[52] U.S. Cl. .................................................. 192/98,
192/70.3, 308/184
[51] Int. Cl. .................................................. F16d 23/14
[50] Field of Search ..................................... 192/98, 110
B, 85 CR, 91 A

[56] References Cited
UNITED STATES PATENTS
2,089,472   8/1937   Geyer............................ 192/85 CA X

| 3,179,217 | 4/1965 | Root............................ | 192/98 X |
| 3,250,353 | 5/1966 | Liszewski et al.............. | 192/110 B X |
| 3,333,664 | 8/1967 | Chapaitis...................... | 192/98 |
| 3,378,120 | 4/1968 | Miller et al. .................. | 192/110 B X |

*Primary Examiner*—Benjamin W. Wyche
*Attorney*—Howson and Howson

ABSTRACT: For a clutch mechanism having a housing, a plurality of pivotally mounted operating members adapted for actuating the clutch between engaged and disengaged positions, said housing including a tubular member, a sleeve of larger internal diameter than the external dimensions of said tubular member slidably mounted on said tubular member, a release bearing assembly mounted on said sleeve engageable with said operating members, means defining a circumferentially extending groove disposed approximately centrally of the axial ends of said tubular member, the inner walls of said tubular member converging outwardly from said groove, and resilient means interposed between said tubular member and sleeve.

PATENTED JAN 4 1972

3,631,954

Inventor:
Albert E. Coaley
by Howson & Howson
Attys.

SELF-ALIGNING CLUTCH RELEASE BEARING

This invention is concerned with operating mechanisms of clutches such as the clutches used in vehicles, which operating mechanism comprises a thrust bearing surrounding and movable along a fixed part. Such a clutch-operating mechanism will hereinafter be called a clutch-operating mechanism of the kind described.

In a clutch-operating mechanism of the kind described, the fixed part is usually a fixed extension of the clutch housing or gear box and operation of the clutch pedal loads one race of the thrust bearing to move the thrust bearing towards clutch-operating members if it is not already in contact with the said members and further movement declutches the clutch. The fixed part is usually an extension of the clutch housing or gear box and the one race of the thrust bearing or a sleeve integral with such race is in contact with and slides along such fixed extension.

In what follows, the thrust bearing and any parts which are integral with either of its races, will be referred to as the sliding part of the clutch-operating mechanism.

According to the present invention, a clutch-operating mechanism of the kind described has a sliding part with a bore of substantially larger internal dimensions than the external dimensions of the fixed part and the sliding part is carried by the fixed part through resilient means of substantially greater resilience than any (or any other) part of the sliding part.

By "greater resilience" is meant that, under load, the resilient means deforms to a greater amount than any part of the sliding part, if the resilient means is not part of the sliding part, or than any other part of the sliding part if the resilient means is part of the sliding part.

The difference in dimensions and the arrangement and resilience of the resilient means in any particular construction according to the invention is chosen to allow the sliding part to shift radially with respect to the fixed part and to shift radially by different amounts along the axial length of the sliding part so that the thrust bearing can adopt a position with respect to the operating members of the clutch which is determined largely by the operating members of the clutch without the sliding member coming into contact with the fixed part. The amount of such radial shifting for which provision is made in any particular case, will depend upon the misalignment expected to be encountered between the axis of the thrust bearing when supported solely by the fixed part and the axis of symmetry of the clutch-operating members and upon the amount by which one clutch-operating member may be expected to "stand proud" of the other clutch-operating members.

According to a feature of the invention, the bore of the sliding part may be provided with a pair of circumferential grooves, one near each end of the bore, and the resilient means may be rubber inserts inserted one into each groove and projecting into the bore. Such inserts need not be complete rings as it has been found that lengths of rubber string which are not quite as long as the circumference of the groove are quite satisfactory.

The material of the resilient means should be such that it does not change shape, and is not deteriorated, from contact with the substances with which it is likely to come into contact in service and preferably it should be such that it acoustically insulates the sliding part from the fixed part.

The invention also includes, for a clutch-operating mechanism of the kind described, a sliding part having a circumferential groove in its bore suitable for receiving a resilient ring by which the sliding part may be supported on the fixed part of a clutch-operating mechanism of the kind described.

The invention further includes a clutch having a clutch-operating mechanism of the kind described, which clutch-operating mechanism has a sliding part with a bore of substantially larger internal dimensions than the external dimensions of the fixed part and the sliding part is carried by the fixed part through resilient means of substantially greater resilience than any (or any other) part of the sliding part.

These and other objects of the present invention and the various features and details of the operation and construction thereof are hereinafter more fully set forth with reference to the accompanying drawing.

Figure 1:
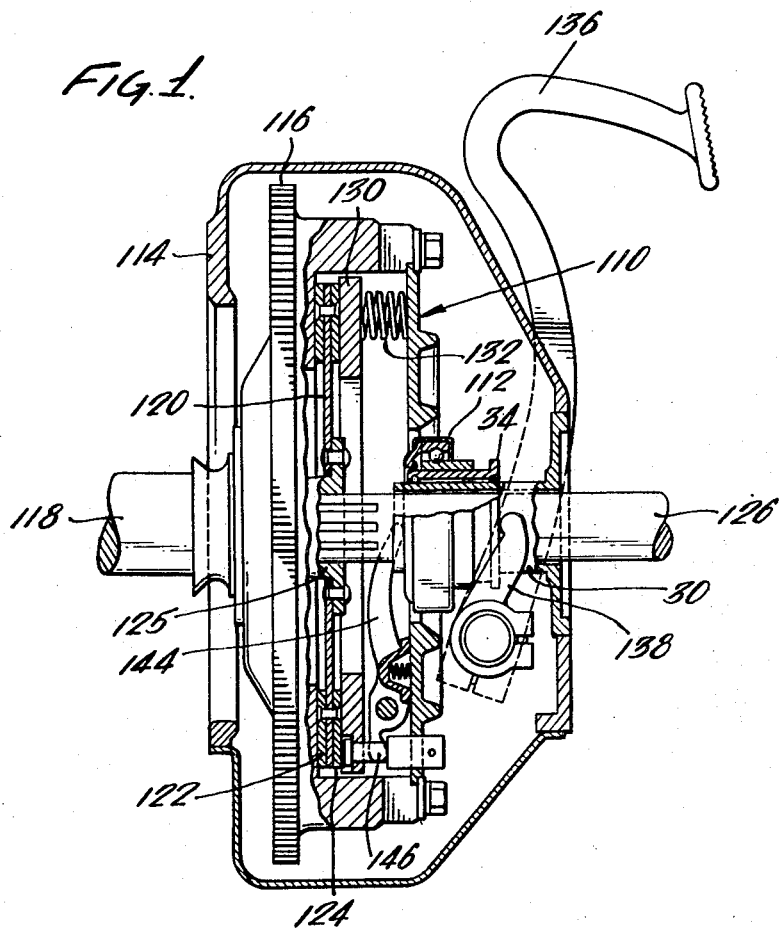
FIG. 1 is a transverse-sectional view of a clutch assembly incorporating a clutch release bearing in accordance with the present invention.

Referring now to the drawing and particularly to FIG. 1 thereof there is illustrated a conventional clutch assembly broadly designated by the numeral 110 incorporating a ball bearing assembly 112 constructed in accordance with the present invention. In the present instance the ball bearing assembly 112 functions as the release bearing in the clutch assembly. However, it is to be understood that the improved bearing construction has other useful applications.

The clutch assembly 110 which is of conventional design includes a housing 114, a flywheel 116 rotatably mounted in the housing, which is suitably secured to the inner end of the engine crankshaft 118. The assembly further includes a clutch disc 120 which mounts on opposite sides of its outer peripheral edge, inner and outer annular disc facings 122 and 124 suitably secured thereto by means of conventional rivets, the clutch disc 120 being secured at its inner edge to a hub 125 mounted on the splined portion of the clutch shaft 126. An annular clutch pressure plate 130 is provided which is normally biased by a plurality of circumferentially spaced compression springs 132 to press the clutch disc facing 122 into pressure-applying relation with the inner face of the flywheel 116. The assembly further includes a pivotally mounted foot pedal 136 which in turn mounts a release fork 138 adapted to engage the radial shoulder of a sleeve 34 on which is mounted the clutch release bearing assembly 112. Pivotally mounted release levers 144 are adapted to be pivoted in a counterclockwise direction upon movement of the sleeve 34 to the left when the foot pedal is depressed whereby the outer tip of the release levers engage the outer axial end of the sleeve mounting the beaded studs 146 connected to the pressure plate, thus the pressure plate is displaced to the right to release the pressure-applying relation of the pressure plate against the clutch disc facings. Of course, upon release of the foot pedal the compression springs return the pressure plate against the facings to engage the clutch.

Considering just briefly the operation of the clutch which is conventional, depression of the clutch foot pedal 136 pivots the release fork 138 in a counterclockwise direction whereby it engages the retainer sleeve 34 and moves the release bearing assembly 112 to the left. The release levers 144 supported in the clutch move the pressure plate against the bias of the compression springs whereby the clutch disc 120 and its facings are freed from the friction grip of the flywheel face and the pressure plate. Accordingly, power is then released from the change speed gear by a splined hub axially floating on the splined clutch shaft.

Figure 2:
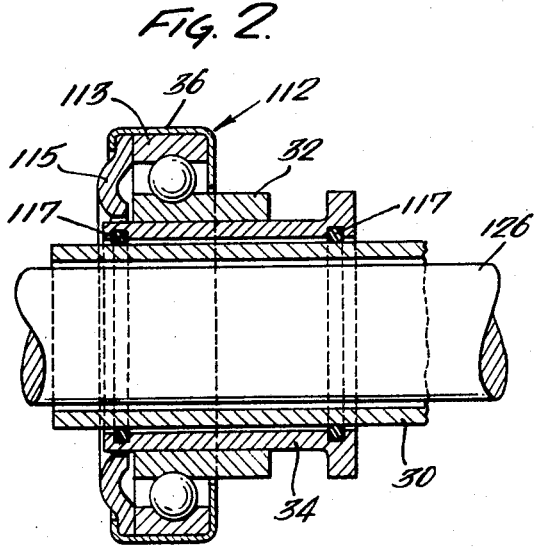
FIG. 2 is an enlarged sectional view of a first embodiment of the bearing assembly in accordance with the present invention.

Referring to FIG. 2, the fixed part 30 is a tubular extension of a gear box on which a sliding part, generally indicated by the reference numeral 34, slides when the clutch pedal is operated. The sliding part comprises a thrust bearing with an inner race 32 and an outer race 113. The inner race 32 is integral with a bearing sleeve 34. The outer race 113 has an operating flange 115 integral with it and there is a sheet metal cover 36 also mounted on the outer race 113.

On operation of the clutch pedal 136 the sliding part 34 is moved to the left as viewed in the drawing and the flange 115 comes into contact with the clutch-operating members if it is not already in contact with the said members which may be toggles or the fingers 144 of a diaphragm spring. Thereafter, continued movement to the left results in the clutch-operating members operating to declutch the clutch.

The description thus far would also describe many prior art clutch-operating mechanisms. That shown in the drawing is an embodiment of the present invention because the bore of the sleeve 34 has an internal diameter substantially larger than the external diameter of the tubular extension 30 and the sliding part 34 is supported from the tubular extension 30 through rings of nitrile rubber 117.

It will be seen that there is one ring 117 at each end of the sleeve 34 and that it is received in a groove in this sleeve. The drawing does not indicate clearly what is in fact the case, that the grooves receiving the rings 117 are substantially wider than the unstrained diameter of the section of the rubber ring which is circular. Thus there is room within the grooves to accommodate the rings when they are deformed.

It has been found in practice with diaphragm springs that one or more of the fingers may stand proud of the plane of the diaphragm. This has the effect that the flange 115 will contact such proud finger first, and, on further movement, in the prior art, will be more heavily loaded by it than by the other fingers of the diaphragm spring.

With the embodiment shown above however, it will be appreciated that if the flange 115 does contact a proud finger first, further movement of the sliding part 34 to the left will be accompanied by a radial shift of the center of the flange 115 with respect to the axis of the extension 30 without the necessity of a radial shift of the center of the other end of the sleeve 34 with respect to the axis of the extension 30 through such radial shift of the other end of the sleeve is possible to the same or a different extent. This is rendered possible by the resilient rubber rings 117 deforming and will result in the sliding part 34 shifting to equalize the reaction load imparted to it by each of the fingers of the diaphragm clutch. Absolute equality may not be obtained because, of course, reaction has to be provided to cause deformation of the rubber ring 117 but such reaction is very small compared with the reaction from the fingers of the diaphragm spring.

Another characteristic of existing clutches is that, due to the inevitable manufacturing tolerances, the fixed part may not be strictly coaxial with the axis of symmetry of the clutch-operating members. On operation, the clutch-operating members define a cone and load the sliding part so that if it is not coaxial with the cone, it is urged to become coaxial.

In the prior art arrangements, any movement of the sliding part in response to such urging is prevented by the fixed part and the result is that the sliding part is unevenly loaded round its circumference.

In the embodiment shown, however, such uneven loading is reduced, and, by appropriate relative dimensioning of the bore of the sliding part 34 and diameter of the fixed part 30 and by appropriate choice of material of the resilient rings, can be reduced so much that it is negligible. The rings 117 allow the axis of the sliding part 111 to shift under differential loading round the circumference and the eventual differential loading is only that which causes the rings 117 to be deformed to the determined extent.

Other embodiments of the invention do not need to have all the characteristics of the one shown. Differences which have already been thought of are: to have zigzag metal ribbons in place of the rubber rings; to have a single resilient ring near the center of the sliding part, instead of two rings one at each end; to have the resilient means mounted on the fixed part with the sliding part sliding relative to the resilient means.

Figure 3:
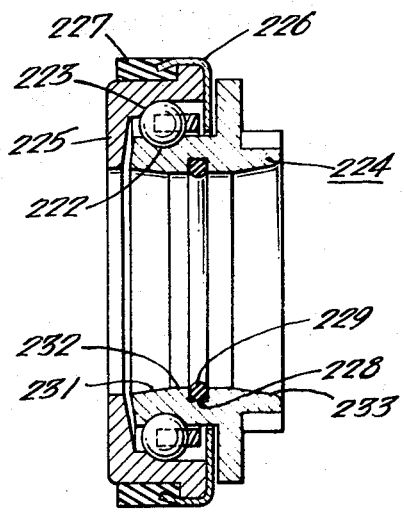
FIG. 3 is an enlarged sectional view of a second embodiment of the bearing assembly in accordance with the present invention.

There is illustrated in FIG. 3 another embodiment of a bearing in accordance with the present invention. In this embodiment the bore of the sliding part is provided with a single circumferential groove and the resilient means may be a rubber insert engaging in the groove.

In such constructions, the invention enables the rubber insert to be more fully embraced by the sliding part, while the bearing can be tilted with respect to the fixed part to an equal extent, than can rubber inserts in a pair of circumferential grooves, one near each end of the bore.

The present invention also includes, for a clutch-operating mechanism of the kind described, a sliding part having a circumferential groove in its bore suitable for receiving a resilient ring by which the sliding part may be supported on the fixed part of a clutch-operating mechanism of the kind described and having a bore which tapers from adjacent the groove to each end so that the diameter of the bore at the ends is greater than the diameter of the bore at the groove.

Considering now more specifically the details and arrangement of this embodiment, the sliding part comprises a thrust bearing with an inner race 222 and an outer race 223. The inner race is formed on the surface of a sleeve 224. The outer race has an operating flange 225 integral with it and there is a sheet metal shield 226 carried on the outer race and a rubber band carried on the exterior of the outer race 223 for damping noise which would otherwise be transmitted by the thrust bearing.

Then the sliding part is incorporated in a clutch-operating mechanism, operation of the clutch pedal moves it to the left as viewed in the drawing, and the flange 225 comes into contact with clutch-operating members, which may be toggles or the fingers of a diaphragm spring, if it is not already in contact with them. Thereafter, continued movement to the left results in the clutch-operating members operating to declutch the clutch.

The sleeve 224 of the sliding part has a single, centrally located groove 228 which contains a nitrile rubber ring 229. When the sliding part is mounted in place in the clutch-operating mechanism, the ring 229 sliding slides on the fixed part of the clutch-operating mechanism and supports the sliding part thereon.

The bore of the sleeve 224 has a tapered part 231 leading from the left-hand end of the bore to adjacent the groove 228, a cylindrical part 232 in which the groove 228 is formed and a tapered part 233 leading from adjacent the groove 228 to the right-hand end of the sleeve. The tapers are such that the diameters of the bore at its end are greater than the diameter of the cylindrical part 232.

In the construction shown in the drawing, the tapered portions of the bore are portions of cones the generatrices of which are tangential to the circular sections of ring 229. Thus, if it is supposed that there is no radial displacement of the sleeve with respect to the fixed part at the center of the groove 228, but that there are equal and opposite radial displacement of the ends of the sleeve, i.e. that the sleeve tilts but does not shift radially with respect to the fixed part, the maximum angle through which the sleeve can tilt while still supported solely by the rubber ring is half the cone angle of the cones of surfaces 231 and 232.

If the bore of the sleeve were cylindrical it is apparent that, to accommodate the same amount of tilting the cylinder would have to have a diameter equal to that at the ends of the sleeve illustrated so that the rubber ring could not be embraced to the same extent.

I claim:

1. For a clutch mechanism having a housing, a plurality of pivotally mounted operating members adapted for actuating the clutch between engaged and disengaged positions, said housing including a tubular member, a sleeve of larger internal diameter than the external dimensions of said tubular member slidably mounted on said tubular member, a release bearing assembly mounted on said sleeve engageable with said operating members, means defining a circumferentially extending groove disposed approximately centrally of the axial ends of said tubular member, the inner walls of said tubular member converging outwardly from said groove, and resilient means interposed between said tubular member and sleeve.

2. For a clutch mechanism having a housing, a plurality of operating members pivotally mounted on the housing and adapted for actuating the clutch between engaged and disengaged positions, said housing including a fixed tubular member, a sleeve of larger internal diameter than the external dimensions of said tubular member providing an annular chamber therebetween and slidably mounted on said tubular member, actuating means for moving the sleeve axially relative to said tubular member, a release bearing assembly mounted on said sleeve engageable with said operating members, said sleeve being an elongated, one piece member extending beyond the opposite ends of said bearing having means at one end, for engagement by said actuating means, resilient means interposed between said tubular member and sleeve permitting slight tilting movement of the axis of said sleeve relative to the axis of said tubular member to provide for substantially uniform loading of all of the operating members.

3. A clutch mechanism as claimed in claim 3 including a circumferential groove in said sleeve adjacent each axial end thereof and said resilient means consists of an O-ring engageable in each groove.

4. A clutch mechanism as claimed in claim 4 wherein the width of each groove is greater than the diameter of the O-ring in the relaxed state to facilitate tilting movement of said sleeve relative to said tubular member.

5. For a mechanism having a housing, a plurality of operating members pivotally mounted on said housing, said housing including a fixed tubular member, a sleeve of larger internal diameter than the external dimensions of said tubular member providing an annular chamber therebetween and slidably mounted on said tubular member, actuating means for moving the sleeve axially relative to said tubular member, a release bearing assembly mounted on said sleeve engageable with said operating members, said sleeve being an elongated one piece member extending beyond the opposite ends of said bearing having means at one end for engagement by said actuating means, resilient means interposed between said tubular member and sleeve permitting slight tilting movement of the axis of said sleeve relative to the axis of said tubular member to provide for substantially uniform loading of all of the operating members.

* * * * *

UNITED STATES PATENT OFFICE
CERTIFICATE OF CORRECTION

Patent No. 3,631,954   Dated   January 4, 1972

Inventor(s)   ALBERT E. COALEY

It is certified that error appears in the above-identified patent and that said Letters Patent are hereby corrected as shown below:

Column 5, line 13; "claim 3" should read --claim 2--

Column 5, line 17; "claim 4" should read --claim 3--

Signed and sealed this 3rd day of October 1972.

(SEAL)
Attest:

EDWARD M. FLETCHER, JR.
Attesting Officer

ROBERT GOTTSCHALK
Commissioner of Patents